(12) United States Patent
Nakajima et al.

(10) Patent No.: US 7,274,562 B2
(45) Date of Patent: Sep. 25, 2007

(54) ELECTRONIC APPARATUS HAVING A LATCH TO HOLD TWO UNITS IN A CLOSED POSITION AND TO BE OPERATED FOR RELEASE

(75) Inventors: Yuji Nakajima, Tokyo (JP); Masato Nakatani, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 848 days.

(21) Appl. No.: 10/635,697

(22) Filed: Aug. 5, 2003

(65) Prior Publication Data

US 2004/0165339 A1    Aug. 26, 2004

(30) Foreign Application Priority Data

Feb. 24, 2003    (JP) ............................. P2003-046231

(51) Int. Cl.
*G06F 1/16* (2006.01)
(52) U.S. Cl. ...................................................... 361/683
(58) Field of Classification Search ................ 361/683; 116/DIG. 28; D13/171, 174; 81/489
See application file for complete search history.

(56) References Cited

U.S. PATENT DOCUMENTS

| | | | | |
|---|---|---|---|---|
| 2,981,011 A | * | 4/1961 | Lombardo | ................... 36/59 R |
| 4,045,888 A | * | 9/1977 | Oxenberg | ..................... 36/114 |
| 5,465,191 A | * | 11/1995 | Nomura et al. | ............. 361/681 |
| 5,556,668 A | * | 9/1996 | Chun | .......................... 427/378 |
| 5,580,107 A | * | 12/1996 | Howell | ......................... 292/95 |
| 6,122,152 A | | 9/2000 | Goto et al. | |
| RE37,190 E | * | 5/2001 | Stowell et al. | ................. 16/422 |
| 6,517,129 B1 | | 2/2003 | Chien et al. | |
| 2002/0163204 A1 | * | 11/2002 | Singleton et al. | ........... 292/122 |
| 2003/0011972 A1 | | 1/2003 | Koo | |
| 2004/0061997 A1 | * | 4/2004 | Skinner | ...................... 361/683 |

FOREIGN PATENT DOCUMENTS

| | | |
|---|---|---|
| EP | 0355203 A | 2/1990 |
| EP | 0703523 A | 3/1996 |
| EP | 1256868 A | 11/2002 |
| JP | 6-59778 | 3/1994 |

* cited by examiner

*Primary Examiner*—Lisa Lea-Edmonds
(74) *Attorney, Agent, or Firm*—Foley & Lardner LLP

(57) ABSTRACT

An electronic apparatus has a first housing, and a second housing connected to the first housing. The second housing rotates between a closed position to be superposed on the first housing, and an open position to expose the first housing, and has a wall. The electronic apparatus includes a latch that mechanically connects the second housing to the first housing in the closed position, and the latch has a slid member that is slidably mounted on the wall. The slid member has an outer surface with a first rib and a second rib. The first rib is arranged on the outer surface, extended in the direction crossing the sliding direction of the slid member. The electronic apparatus has second rib arranged in one of on the slid member or on the wall, extended in the direction crossing a second housing rotating direction.

15 Claims, 5 Drawing Sheets

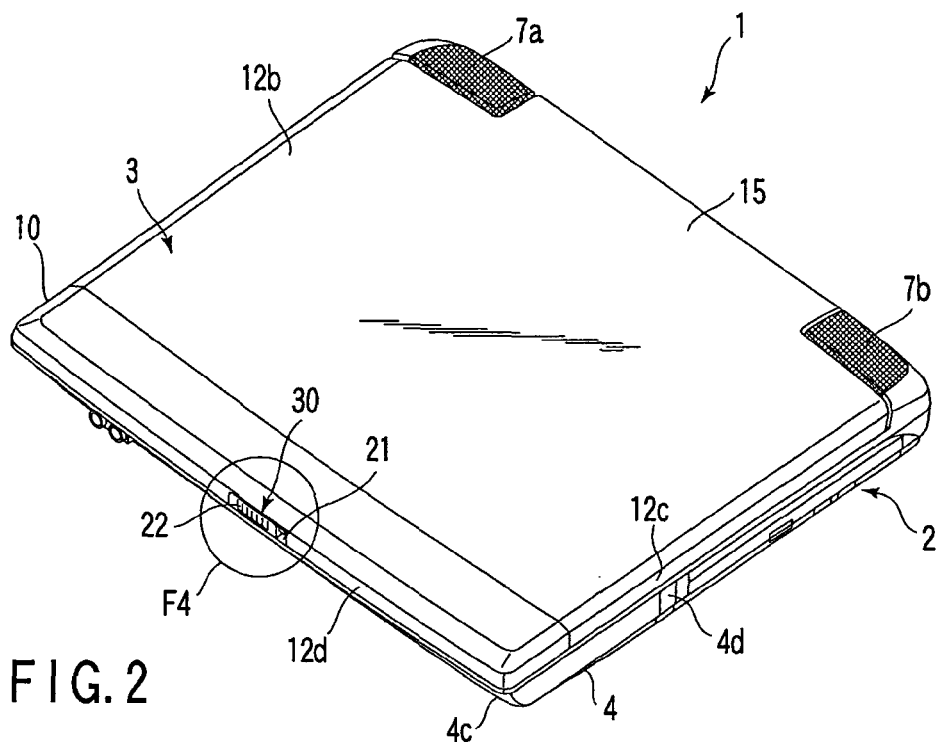
FIG. 2
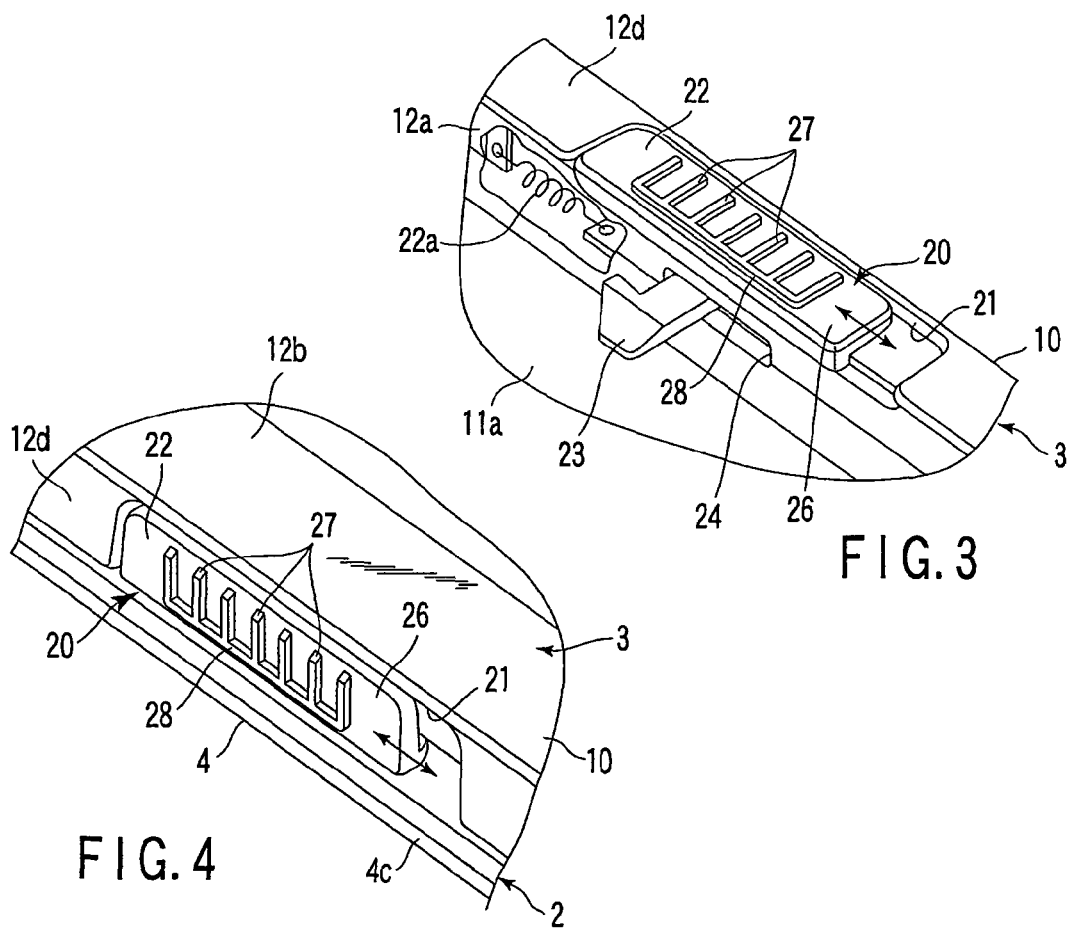
FIG. 3
FIG. 4

ELECTRONIC APPARATUS HAVING A LATCH TO HOLD TWO UNITS IN A CLOSED POSITION AND TO BE OPERATED FOR RELEASE

CROSS-REFERENCE TO RELATED APPLICATIONS

This application is based upon and claims the benefit of priority from Japanese Patent Application No. 2003-46231, filed Feb. 24, 2003, the entire contents of which are incorporated herein by reference.

BACKGROUND OF THE INVENTION

1. Field of the Invention

This invention relates to an electronic apparatus like a portable computer, having a display unit that rotates between a closed position and an open position. More particularly, the invention relates to the structure of a latch that locks a display unit at a closed position or unlocks the display unit.

2. Description of the Related Art

A portable computer has a main unit including a keyboard in the upper surface, and a display unit containing a liquid crystal display panel. The display unit is connected to the rear end of the main unit through a hinge. Thus, the display unit may rotate between a closed position to lie to cover a keyboard from above, and an open position to rise to expose the keyboard and the liquid crystal display panel.

A portable computer of this type has a latch to lock the display unit in the closed position. The latch is located at the front end of the display unit. The latch links a slid member to be caught by a fingertip, and an engaging claw projecting from the slid member. The slid member may move between a locked position and an unlocked position, and is held in the locked position through a spring. The slid member slides in the direction along the width of the display unit when a user operates the slid member against the force of the spring and releases it.

When the display unit is rotated to the closed position, the engaging claw of the latch hooks in an engaging hole formed in the upper surface of the main unit. Then, the display unit is held in the closed position. To rotate the display unit toward the open position, the slid member of the latch is slid by a fingertip from the locked position toward the unlocked position. By sliding the slid member, the engaging claw disengages from the engaging hole, and the display unit may be rotated to the open position.

As disclosed by the Japanese Patent Publication (KOKAI) No. 6-59778, the conventional slid member of the latch has an outer surface to be touched by a fingertip of a user, and a plurality of rib-like projections formed in the outer surface. The projections extend in the direction orthogonal to the sliding direction of the slid member, and are arranged with intervals in the sliding direction of the operated portion. These projections make it easy to hold a fingertip on the slid member, when sliding the latch from the locked position to the unlocked position. Therefore, the slid member may be securely slid from the locked position to the unlocked position.

The slid member of the latch is urged by the spring toward the locked position. Thus, when the slid member is released after being slid to the unlocked position, the slid member will return to the locked position. Therefore, in the related art, when rotating the display unit from the closed position to the open position, the slid member is pushed up by a fingertip while being held at the unlocked position. This applies an upward force to the display unit to separate it from the main unit, and the display unit rotates toward the open position.

The slid member push-up direction is substantially orthogonal to the sliding direction of the slid member. Thus, the projections of the slid member extend along the slid member push-up direction. As a result, when the display unit is rotated to the open position through the slid member, the fingertip becomes difficult to catch the projections of the slid member. Thus, the fingertip may slip and go off the slid member. This degrades the operability when rotating the display unit from the closed position to the open position.

BRIEF SUMMARY OF THE INVENTION

Embodiments of the present invention provide an electronic apparatus having a latch to hold two unit in a closed position and to be operated for release.

According to an embodiment of the present invention, an electronic apparatus has a first housing, and a second housing connected to the first housing. The second housing rotates between a closed position to be superposed on the first housing, and an open position to expose the first housing, and has a wall to be exposed even if the second housing is in the closed position. The electronic apparatus includes a latch that mechanically connects the second housing to the first housing in the closed position, and the latch has a slid member that slidably mounted on the wall. The slid member has an outer surface with a first rib. The first rib is arranged on the outer surface, extended in the direction crossing the sliding direction of the slid member. The electronic apparatus has second rib arranged in one of on the slid member or on the wall, extended in the direction crossing a second housing rotating direction.

Additional features and advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2 is a perspective view showing the portable computer with a display unit set in a closed position in the first embodiment;

FIG. 3 is a magnified perspective view showing a part F3 shown in FIG. 1 in the first embodiment;

FIG. 4 is a magnified perspective view showing a part F4 of FIG. 2 in the first embodiment;

DETAILED DESCRIPTION

Preferred embodiments according to the present invention will be described hereinafter with reference to the accompanying drawings.

Figure 1:
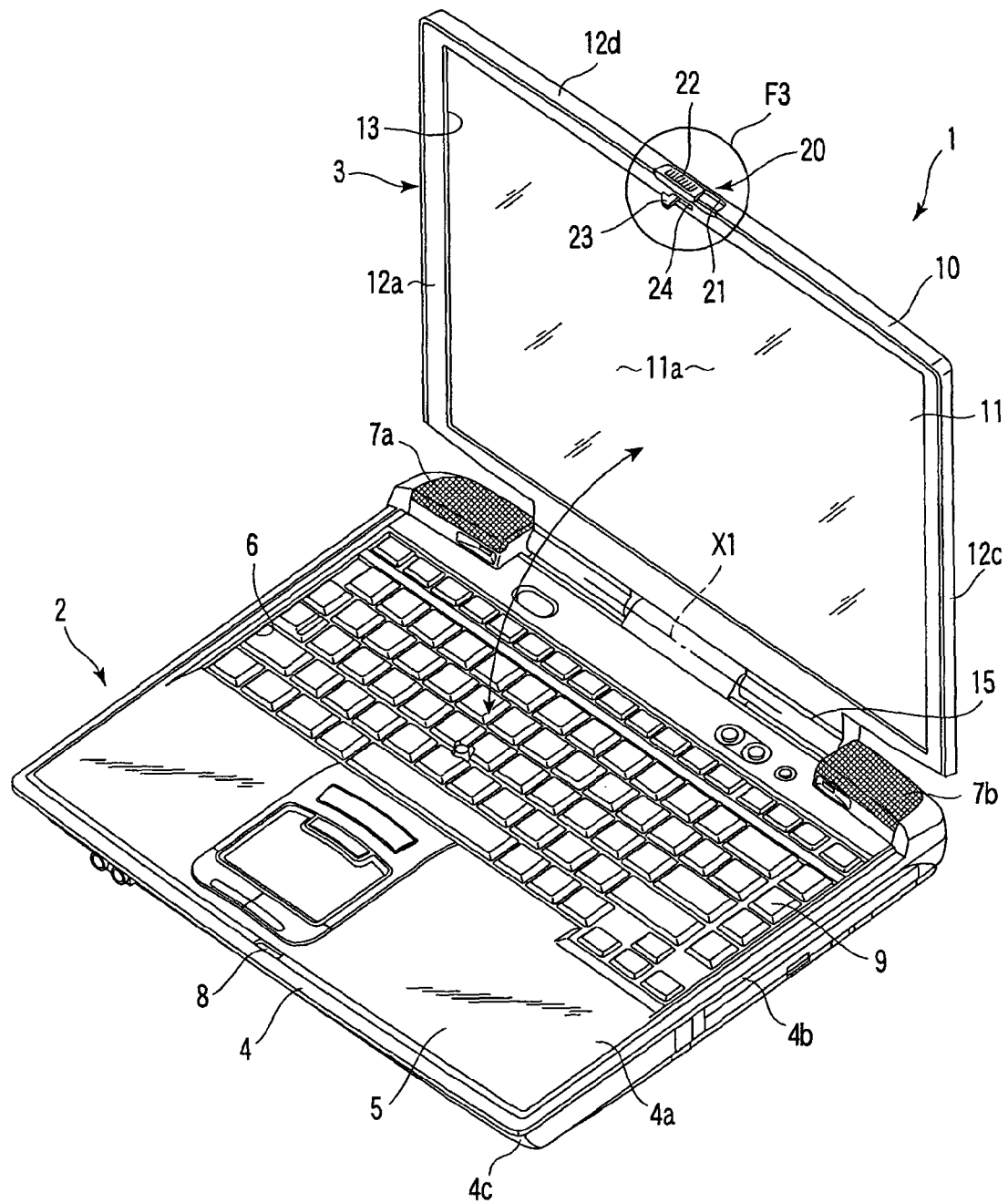
FIG. 1 is a perspective view showing a portable computer with a display unit set in an open position according to a first embodiment of the present invention.

FIG. 1 and FIG. 2 show a portable computer 1 as an electronic apparatus. The portable computer 1 comprises a main unit 2 and a display unit 3.

The main unit 2 has a first housing 4. The first housing 4 is a flat box having an upper wall 4a, left and right side walls 4b, a front wall 4c and a bottom wall (not shown). The upper wall 4a has a palm rest 5 and a keyboard mounting part 6. The palm rest 5 extends in the width direction of the first housing 4. At the center in the width direction of the palm rest 5, an engaging hole 8 is formed. The engaging hole 8 is located at the front end of the palm rest 5. The keyboard mounting part 6 is located at the rear of the palm rest 5, and supports a keyboard 9.

At the rear end of the upper wall 4a, a pair of speaker units 7a and 7b is provided. The speaker units 7a and 7b are separated each other in the width direction of the first housing 4, and project upward from the rear end of the upper wall 4a.

The display unit 3 has a display housing 10 as a second housing, and a liquid crystal display panel 11. The display housing 10 is a flat box having a front wall 12a, a rear wall 12b, and left and right side walls 12c and upper wall 12d. In the front wall 12a of the display housing 10, a square opening 13 is formed. The liquid display panel 11 has a screen 11a to display images. The screen 11a is exposed outward the display housing 10 through the opening 13.

As shown in FIG. 1 and FIG. 2, the display housing 10 has a leg 15 projecting toward the first housing 4. The leg 15 is led between the speaker units 7a and 7b, and connected to the rear end of the first housing 4 through hinges. The hinges have a horizontal axis X1 along the width direction of the first housing 4. Thus, the display unit 3 may rotate between a closed position and an open position, taking the axis X1 of the hinges as a center of rotating. At the closed position shown in FIG. 2, the display unit 3 lies to cover the palm rest 5 and keyboard 9 from above. At the open position shown in FIG. 1, the display unit 3 rises against the main unit 2, and the palm rest 5, keyboard 9 and screen 11a are exposed outward the portable computer 1.

As shown in FIG. 1 and FIG. 2, the display unit 3 has a latch 20. The latch 20 locks the display unit 3 at the closed position, and unlocks the display unit 3. The latch 20 is built in as one body with the upper wall 12d of the display housing 10, so as to be located at the other end opposite to the leg 15 of the display housing 10.

More specifically, the upper wall 12d of the display housing 10 is located opposite to the leg 15 with the liquid crystal display panel 11 interposed therebetween. At the center along the width direction of the upper wall 12, a notch 21 is formed.

Figure 5:
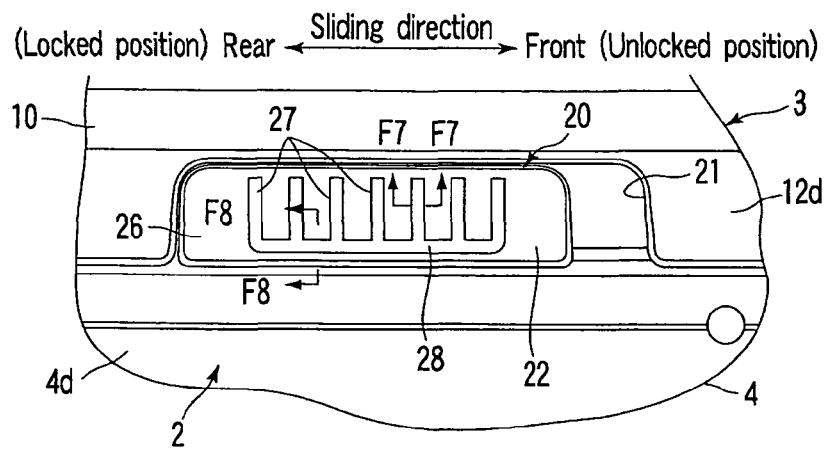
FIG. 5 is a front view showing a slid member of a latch held at a locked position in the first embodiment.
Figure 6:
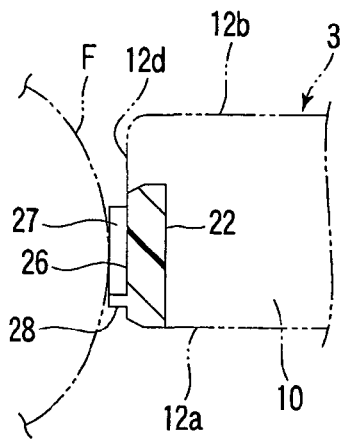
FIG. 6 is a sectional view showing the positional relationship between first and second ribs on the slid member in the first embodiment.

As shown in FIG. 3 to FIG. 5, the notch 21 has the shape of an elongated opening extending in the width direction of the display housing 10.

The latch 20 has a slid member 22. The slid member 22 is supported by the display housing 10. The slid member 22 is made like a rectangular strip extending in the width direction of the display housing 10, and is large enough to be pressed by a thumbtip. The slid member 22 is located inside of the notch 21, and is exposed outward of the display housing 10 through the notch 21.

The slid member 22 is slidable between the locked position and the unlocked position, and is held in the locked position by a spring 22a shown in FIG. 3. The slid member 22 slides along the width direction of the display housing 10. The slid member 22 linked to an engaging claw 23. The engaging claw 23 slides together with the slid member 22. The end of the engaging claw 23 projects from the front wall 12a of the display housing 10 through a slit 24 open in the front wall 12a of the display housing 10.

When the display unit 3 is rotated to the closed position, the engaging claw 23 of the slid member 22 enters the engaging hole 8 of the first housing 4, and engages with the opening edge of the engaging hole 8. The display unit 3 is then locked at the closed position. When the slid member 22 of the latch 20 is slid by a fingertip from the locked position to the unlocked position while the display unit 3 is being locked at the closed position, the engaging claw 23 disengages from the opening edge of the engaging hole 8. Then, the display unit 3 is released, and may be rotated from the closed position toward the open position.

As shown in FIG. 3 to FIG. 6, the slid member 22 of the latch 20 has a flat outer surface 26 to be touched by a fingertip F. The outer surface 26 is located on the same level as the upper wall 12d of the display housing 10, or projects a little from the upper wall 12d. On the outer surface 26, a plurality of first ribs 27 and a single second rib 28 are formed. The first ribs 27 and second rib 28 project from the outer surface 26. The projection heights of these ribs 27 and 28 are equal.

The first ribs 27 extends in the direction orthogonal to the sliding direction of the slid member 22, and are arranged with an interval in the sliding direction. In other words, the first ribs 27 extend along the thickness direction of the display housing 10. Thus, one ends of the first ribs 27 adjoin the front wall 12a of the display housing 10, and the other ends of the first ribs 27 adjoin the rear wall 12b of the display housing 10.

The second rib 28 extends along the sliding direction of the slid member 22. More concretely, the second rib 28 extends in a straight line contacting the ends of each of the first ribs 27, and is orthogonal to the first ribs 27. Thus, the second rib 28 is located at the position deviated from the rear wall 12b of the display housing 10 to the front wall 12a, with respect to the first ribs 27. In other words, the second rib 28 is located at the rear side of the rotating direction, when the display unit 3 is rotated from the closed position to the open position.

Figure 7:
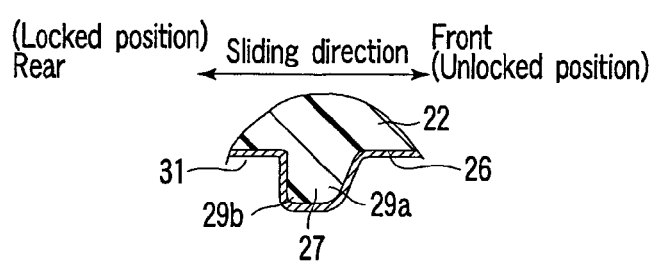
FIG. 7 is a sectional view taken along a line F7-F7 shown in FIG. 5 in the first embodiment.

As shown in FIG. 7, each first rib 27 has a front edge 29*a* and a rear edge 29*b*. The front or most forward edges 29*a* of the first ribs 27 are located at the front side of the sliding direction, when the slid member 22 is slid from the locked position toward the unlocked position (i.e., to the right as shown in FIG. 7). The rear edges 29*b* of the first ribs 27 are located at the rear side of the sliding direction, when the slid member 22 is slid from the locked position toward the unlocked position. The rear edges 29*b* are made squarer than the front edges 29*a*. This makes it easy to catch the rear edges 29*b* of the first ribs 27 by the ball of the fingertip F.

Figure 8:
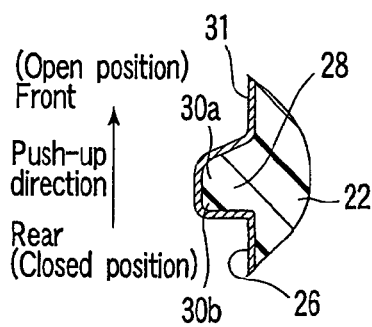
FIG. 8 is a sectional view taken along a line F8-F8 shown in FIG. 5 in the first embodiment.

The push-up direction indicated in FIG. 8 is the vertical direction when the portable computer is positioned horizontally. More generally, if the computer is viewed from the right side wall 4*b*, the opening or rotating direction of the second housing or display unit 3 is the clockwise direction. The second rib 28 crosses this rotation direction of the display unit 3.

As shown in FIG. 8, the second rib 28 has a front edge 30*a* and a rear edge 30*b*. The front edge 30*a* of the second rib 28 is located at the front side of the push-up direction, when the display unit 3 is pushed up from the closed position to the open position. The rear edge 30*b* of the second rib 28 is located at the rear side of the push-up direction, when the display unit 3 is pushed up from the closed position to the open position. The rear edge 30*b* is made squarer than the front edge 30*a*. This makes it easy to catch the rear edge 30*b* of the second rib 28 by the ball of the fingertip F.

The outer surface 26 of the slid member 22, first ribs 27 and second rib 28 are coated by a plating layer 31. The plating layer 31 increases the appearance quality of the slid member 22. Existence of the plating layer 31 increases the smoothness of the outer surface 26, first ribs 27 and second rib 28, makes the feeling of the slid member 22 good when touched by the fingertip F.

Next, the process of rotating the display unit 3 from the closed position to the open position will be explained.

First, pressing the fingertip F of a thumb to the outer surface 26 of the slid member 22, the slid member 22 is slid from the locked position to the unlocked position, against the force of the spring 22*a*. By this sliding operation, the engaging claw 23 disengages from the opening edge of the engaging hole 8, and the engaging claw 23 may be pulled out from the engaging hole 8.

Next, the slid member 22 is pushed up while holding the slid member 22 at the unlocked position by the fingertip F. By this push-up operation, the display unit 3 rotates upward centering around the axis X1 of the hinges, and the engaging claw 23 is pulled out from the engaging hole 8. In this time, the other end of the display housing 10 is raised from the upper wall 4*a* of the first housing 4, making a clearance there. Then, the fingertip F pushing up the slid member 22 is moved a little toward the clearance direction, and is hanged on the other end of the display housing 10. Finally, the display unit 3 is rotated toward the open position by the fingertip F. By this rotating operation, the display unit 3 is raised. The display unit 3 is held at the open position by the braking force of the hinges.

In the portable computer 1 with the above-mentioned structure, the plurality of first ribs 27 projecting from the outer surface 26 of the slid member 22, are extended in the direction orthogonal to the sliding direction of the slid member 22, and arranged with intervals in the sliding direction. Thus, the fingertip F catches the first ribs 27 when the slid member 22 is slid from the locked position to the unlocked position, preventing a slip of the fingertip F.

Particularly, in the first ribs 27, the rear edges 29*b* are made squarer than the front edges 29*a*, and the ribs 27 are located at the rear side of the sliding direction of the slid member 22 toward the unlocked position. Thus, when the slid member 22 is slid toward the unlocked position, the ball of a finger F easily catches the rear edges 29*b* of the slid member 22. Therefore, the operability is improved when sliding the slid member 22 from the locked position toward the unlocked position.

Further, the second rib 28 projecting from the outer surface 26 extends straight in the sliding direction of the slid member 22, just like riding over one ends of the first ribs 27. Thus, at the timing when pushing up the slid member 22 while holding the slid member 22 at the unlocked position by the fingertip F, the second rib 28 extends in the direction orthogonal to the push-up direction of the slid member 22. Therefore, the second rib 28 prevents slipping of the fingertip F.

In addition, the rear edge 30*b* of the second rib 28 is made squarer than the front edge 30*a*, and the second rib 28 is located at the rear side of the push-up direction of the slid member 22. Therefore, when pushing up the slid member 22, the ball of a finger easily catches the rear edge 30*b* of the slid member 22. Therefore, the force of pushing up the slid member 22 is transmitted to the display housing 10, and the display unit 3 may be securely rotated from the closed position toward the open position. Therefore, the operability is improved when rotating the display unit 3 from the closed position to the open position.

Particularly, as in this embodiment, even if the outer surface 26, first ribs 27 and second rib 28 are coated by a smooth plating layer 31, the ball of the fingertip F securely catches the second rib 28 when pushing the slid member 22 by the fingertip F. Thus, when rotating the display unit 3 from the closed position toward the open position, a slip of the fingertip F may be prevented.

The present invention is not to be limited to the above-mentioned first embodiment. A second embodiment of the present invention will be described hereinafter, referring to FIG. 9 and FIG. 10.

The second embodiment is different from the first embodiment in the configuration to prevent a slip of the fingertip F when pushing up the slid member 22. The other basic configuration of the latch 20 is the same as the first embodiment. Therefore, the same reference numerals are given to the same components as those in the first embodiment, and the detailed description will be omitted.

Figure 9:
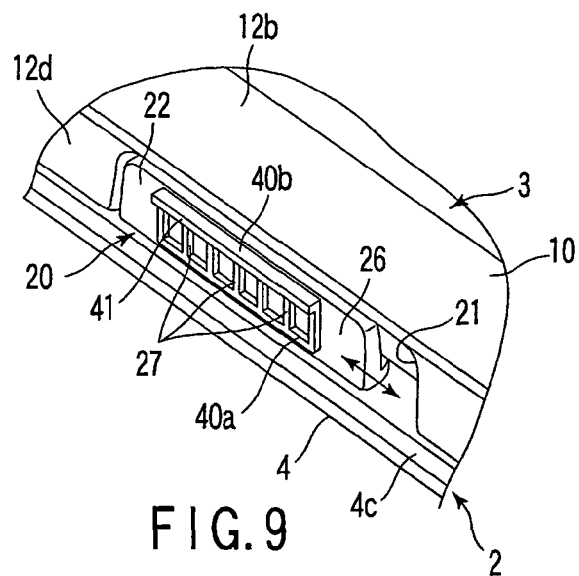
FIG. 9 is a perspective view showing the positional relationship between first and second ribs on a slid member according to a second embodiment of the present invention.
Figure 10:
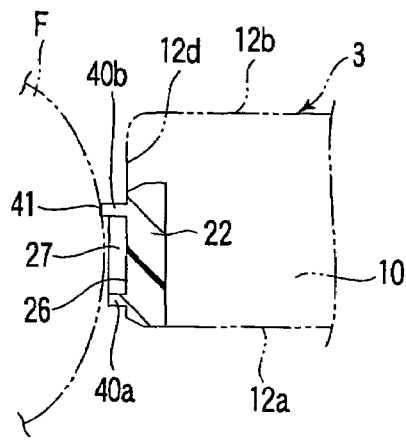
FIG. 10 is a sectional view showing the positional relationship between first and second ribs on the slid member in the second embodiment.

As shown in FIG. 9 and FIG. 10, the slid member 22 has a pair of second ribs 40*a* and 40*b* projecting from the outer surface 26. One of the second rib 40*a* extends like a straight line just like riding over one ends of the first ribs 27, and is orthogonal to the first ribs 27. The second rib 40*a* is located at the position deviated to the front wall 12*a* of the display housing 10 rather than the rear wall 12*b*. Thus, the second rib 40*a* is located at the rear side of the rotating direction, when the display unit 3 is rotated from the closed position to the open position. The projection heights of the first ribs 27 and second ribs 40*a* are equal.

The other second rib 40*b* extends like a straight line just like riding over the other ends of the first ribs 27, and is orthogonal to the first ribs 27. Therefore, the second ribs 40*a* and 40*b* are arranged in parallel each other with intervals in the direction of pushing up the slid member 22. The second ribs 40*a* and 40*b* face each other across the first ribs 27.

Further, the other second rib 40b is located at the position deviated to the rear wall 12b of the display housing 10, rather than the front wall 12a, and located at the front side of the direction of pushing up the slid member 22. The projection height of the second rib 40b is higher than the first ribs 27. Thus, as shown in FIG. 10, the end 41 of the second rib 40b projects in the direction of separating further away from the upper wall 12d than the first ribs 27 and second rib 40a.

As the slid member 22 has a pair of second ribs 40a and 40b that are arranged separately and parallel to each other in the push-up direction, the second ribs 40a and 40b bites the ball of the fingertip F and prevents a slip of the fingertip F when the fingertip F pushes up the slid member 22. Particularly, the second rib 40b has a higher projection height than the other ribs 27 and 40a. Therefore, the ball of the fingertip F easily catches the end 41 of the second rib 40b.

As a result, the fingertip F does not slip when pushing up the slid member 22, and the force of pushing up the slid member 22 is securely transmitted to the display unit 3. Therefore, the display unit 3 may be speedily rotated from the closed position toward the open position.

Figure 11:
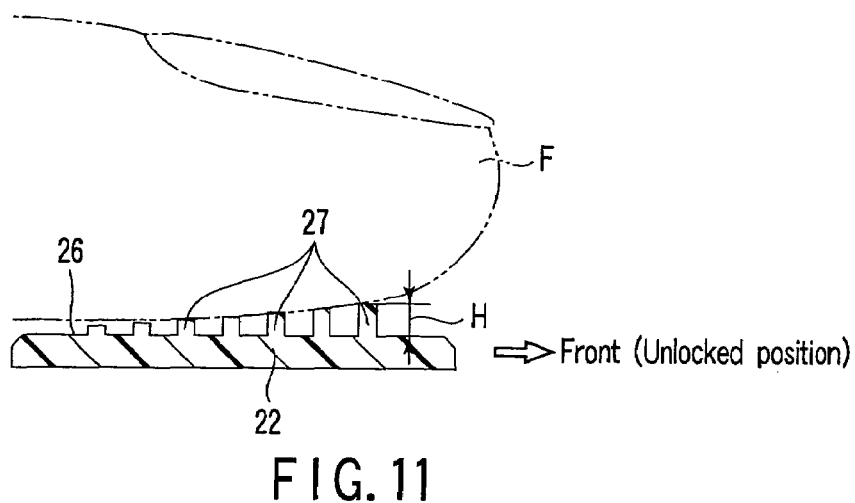
FIG. 11 is a sectional view showing the shape of first ribs on a slid member according to a third embodiment of the present invention.

FIG. 11 shows a third embodiment of the present invention.

The difference between the third embodiment and the above-mentioned first embodiment is that the height H of the projections of the adjacent first ribs 27 are made different. The other configuration of the latch 20 is the same as the first embodiment.

As shown in FIG. 11, when the slid member 22 is slid from the locked position to the unlocked position, the projection height H of the first ribs 27 are higher in the first ribs 27 located at the front side of the sliding direction of the slid member 22. In other words, as the slid member 22 advances from the rear to the front in the sliding direction, the projection height H of the first ribs 27 gradually increases.

In this structure, when pressing the slid member 22 by the fingertip F in the direction to unlock the display unit 3, the ball of the fingertip F securely catches the front end of the first ribs 27. Therefore, a slip of the fingertip F can be prevented when sliding the slid member 22, and the operability of the slid member 22 is improved.

Figure 12:
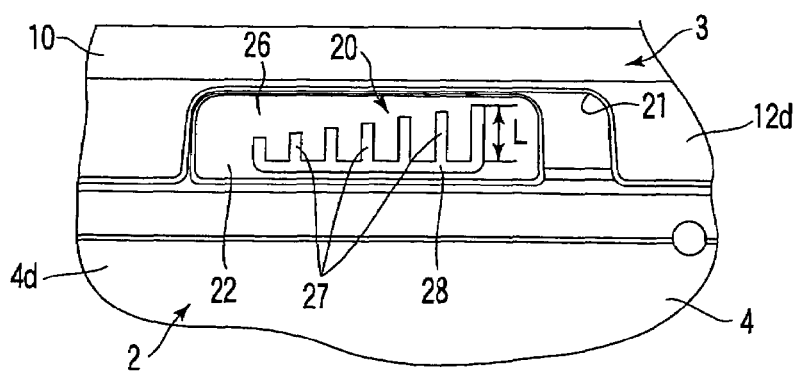
FIG. 12 is a front view showing the shape of first ribs on a slid member according to a fourth embodiment.

FIG. 12 shows a fourth embodiment of the present invention.

The fourth embodiment is different from the above-mentioned first embodiment in the point that the length L of the adjacent first ribs 27 are made different. The other configuration of the latch 20 is the same as the first embodiment.

As shown in FIG. 12, when the slid member 22 is slid from the locked position to the unlocked position, the length L of the first ribs 27 are longer in the first ribs 27 located at the front side of the sliding direction of the slid member 22. In other words, as the slid member 22 advances from the rear to the front in the sliding direction, the length L of the first ribs 27 gradually increases.

In this structure, the first ribs 27 are caught by a fingertip when sliding the slid member 22 from the locked position to the unlocked position, preventing a slip of the fingertip. Further, the second rib 28 is caught by a fingertip when the slid member 22 is pushed up, preventing a slip of the fingertip. Therefore, a fingertip easily catches the slid member 22, ensuring the sliding operation of the slid member 22 and the succeeding push-up operation.

In addition, the length L of the first ribs 27 becomes longer as the slid member 22 is slid forward, all the first ribs 27 function as an arrow to indicate the sliding direction of the slid member 22. Thus, simply by viewing the outer surface 26 of the slid member 22, the sliding direction of the slid member 22 may be recognized when a user is unlocking the display unit 3.

Figure 13:
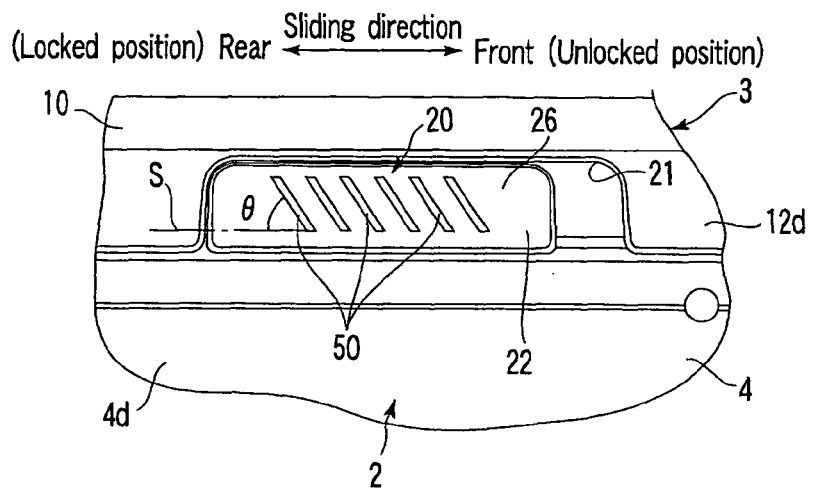
FIG. 13 is a front view showing the shape of ribs on a slid member according to a fifth embodiment.

FIG. 13 shows a fifth embodiment of the present invention.

The fifth embodiment is different from the above-mentioned first embodiment in the configuration for preventing a slip of a fingertip against the slid member 22. The other basic configuration of the latch 20 is the same as the first embodiment.

As shown in FIG. 13, the slid member 22 has a plurality of ribs 50 projecting from the outer surface 26. The ribs 50 are inclined by an angle of θ against the straight line S along the sliding direction of the slid member 22, and arranged with intervals in the sliding direction of the slid member 22.

In this structure, a fingertip catches the ribs 50 and a slip of the fingertip is prevented, when a user is sliding the slid member 22 from the locked position to the unlocked position. Further, the ribs 50 are inclined against the sliding direction of the slid member 22, and a fingertip catches the edges of the ribs 50 when the slid member 22 is pushed up, and a slip of the fingertip is prevented. Therefore, the fingertip easily catches the slid member 22, ensuring the sliding operation of the slid member 22 and the succeeding push-up operation.

Figure 14:
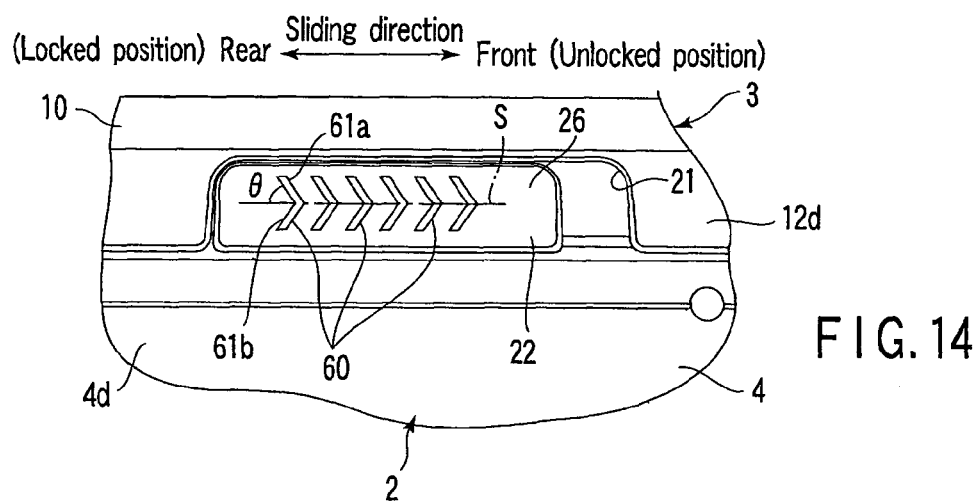
FIG. 14 is a front view showing the shape of ribs on a slid member according to a sixth embodiment.

Further, FIG. 14 shows a sixth embodiment of the present invention.

As shown in FIG. 14, the slid member 22 has a plurality of ribs 60 projecting from the outer surface 26. The ribs 60 are arranged with intervals in the sliding direction of the slid member 22. Each rib 60 has a first part 61a and a second part 61b. The first part 61a is inclined by an angle of θ against the straight line S along the sliding direction of the slid member 22. The second part 61b is inclined reversely to the inclined direction of the first part 61a. Thus, each rib 60 has substantially a V-shaped form becoming thinner along the sliding direction when the slid member 22 is slid toward the unlocked position.

In this structure, the ribs 60 are caught by a fingertip when the slid member 22 is slid from the locked position to the unlocked position, preventing a slip of the fingertip. The ribs 60 has a substantially V-shaped form, and when the slid member 22 is pushed up with a fingertip, the V-shaped bent edges of the ribs 60 are caught by the fingertip, preventing a slip of the fingertip. Therefore, the fingertip easily catches the slid member 22, ensuring the sliding operation of the slid member 22 and the succeeding push-up operation.

Figure 15:
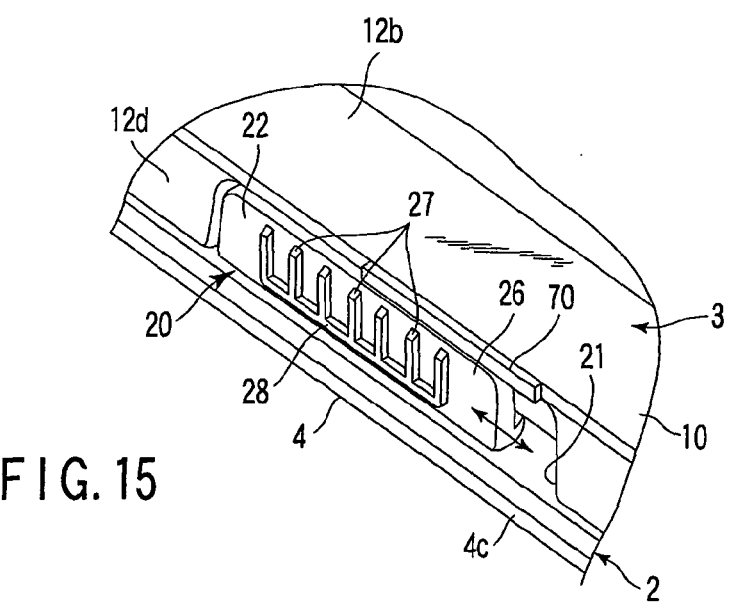
FIG. 15 is a perspective view showing the positional relationship between first ribs on a slid member and a second rib on a upper wall according to a seventh embodiment of the present invention.

FIG. 15 shows a seventh embodiment of the present invention.

The seventh embodiment is different from the above-mentioned first embodiment in the point that there are two second ribs 28 and 70. Particularly, the second rib 70 is formed not on the slid member 22 but on the upper wall 12d. The other basic configuration of the latch 20 is the same as the first embodiment.

The second rib 70 is arranged at a portion elongated in the direction of the first rib within the upper wall 12d, extended in the direction crossing the second housing rotating direction. The second rib 70 also extends along a straight line, and is orthogonal to the first ribs 27. Further, the position of the second rib 70 is such that it is positioned adjacent the first ribs 27 when the slid member 22 is moved to the unlocked position. Therefore, the second ribs 28 and 70 are arranged in parallel each other with an interval therebetween in extending in the direction of the rotating direction of the display unit 3.

The projection height of the second rib 70 is higher than the first ribs 27. Therefore, the ball of the fingertip F may easily engage the second rib 28 and 70.

As a result of the above construction, the user's fingertip F will not slip when pushing up the slid member 22, and the force of pushing up the slid member 22 is easily transmitted to the display unit 3. Therefore, the display unit 3 may be easily and quickly rotated from the closed position toward the open position.

In the above-mentioned embodiment, the second ribs 28 and 70 are arranged as shown in FIG. 15, but the present invention is not to be limited to this structure. The second rib 70 may be arranged without the second rib 28 on the slid member 22. According to this arrangement, a slid member may be conventional type.

Further, the slid member is provided at the center of the upper wall 12*d* of the display housing in the seventh embodiment, but the present invention is not to be restricted to this configuration. It is possible, for example, to provide a slid member at the ends of the left and right side walls of the display housing, and to operate these slid members by both hands. Additionally, it is possible to form the rib 70 as an integral extension or integral projection of the rear wall 12*b*. In such an embodiment, the rear wall could be molded as one piece with the projecting rib integrally formed. The operation of this projecting rib is essentially the same in the case of the rib 70 shown in FIG. 15.

An electronic apparatus according to the present invention is not to be limited to a portable computer. The invention may be embodied in other electronic apparatuses having a lid to cover the input/display screen, for example. In these electronic apparatuses, the lid corresponds to a second housing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An electronic apparatus, comprising:
a first housing;
a second housing connected to the first housing, the second housing rotating between a closed position to be superposed on the first housing, and an open position to expose the first housing, and having a front wall, a rear wall and an upper wall, said upper wall being exposed even if the second housing is in the closed position;
a latch which mechanically connects the second housing to the first housing in the closed position, the latch has a slid member slidably mounted on the upper wall, the slid member having an outer surface with a first rib which is arranged on the outer surface, extended in the direction crossing the sliding direction of the slid member; and
a second rib arranged in one of (a) on said slid member, (b) on said upper wall, or (c) on said rear wall, said second rib extending in the direction crossing a second housing rotating direction,
wherein the second housing rotating direction is perpendicular to the sliding direction.

2. An electronic apparatus according to claim 1, wherein the second rib includes two rib members positioned with the first rib therebetween.

3. An electronic apparatus according to claim 1, wherein the first rib has a projection height equivalent to the second rib.

4. An electronic apparatus according to claim 1, wherein the second rib has a higher projection height than the first rib.

5. An electronic apparatus, comprising:
a first housing;
a second housing having one end supported by the first housing and the other end located opposite to the one end, the second housing rotating between a closed position to cover the first housing, and an open position to expose the first housing, and the second housing having an upper wall positioned at the other end; and
a latch mounted at the other end of the second housing, the latch sliding along a longitudinal direction of the second housing, between a locked position to lock onto the first housing when the second housing is in the closed position, and an unlocked position to release the second housing from the first housing, the latch member having a slid member which is slidably mounted on the upper wall, the slid member having an outer surface with a plurality of first ribs and at least one second rib,
wherein the first ribs are projected from the outer surface, extended in the direction crossing a sliding direction of the slid member, and arranged with intervals in the sliding direction of the slid member; and the at least one second rib is projected from the outer surface, extended in a direction crossing a second housing rotating direction,
wherein the second housing rotating direction is perpendicular to the sliding direction.

6. An electronic apparatus according to claim 5, wherein each of the first ribs has a front edge located toward the sliding direction when the slid member is slid from a locked position toward an unlocked position, and a rear edge located away from the sliding direction of the slid member; and the rear edge of the first rib is made squarer than the front edge.

7. An electronic apparatus according to claim 5, wherein the second rib has a front edge located toward the rotating direction when the second housing is rotated from the closed position to the open position, and a rear edge located away from the rotating direction of the second housing; and the rear edge of the second rib is made squarer than the front edge.

8. An electronic apparatus according to claim 5, wherein successive first ribs are longer than preceding first ribs in the sliding direction of the slid member wherein the sliding direction is from the locked position to the unlocked position.

9. An electronic apparatus according to claim 5, wherein successive first ribs have a projection height higher than predecessor first ribs in the sliding direction of the slid member wherein the sliding direction is from the locked position to the unlocked position.

10. An electronic apparatus according to claim 5, wherein the slid member is located at the center of the upper wall.

11. An electronic apparatus according to claim 5, wherein the at least one second rib extends over the first ribs.

12. An electronic apparatus according to claim 5, wherein the outer surface, the first ribs and the at least one second rib of the slid member are coated by a plating layer.

13. An electronic apparatus according to claim 5, wherein the latch includes a spring that urges the slid member toward the locked position.

14. An electronic apparatus comprising:
- a first housing;
- a second housing supported by the first housing, the second housing rotatable in a second housing rotating direction between a closed position to cover the first housing, and an open position to expose the first housing; and
- a latch provided in the second housing, the latch sliding between a locked position to hook on the first housing when the second housing is in the closed position, and an unlocked position to release the first housing, the latch having a slid member to be operated when rotating the second housing from the closed position to the open position, the slid member having an outer surface with a plurality of ribs projected from the outer surface, wherein the plurality of ribs are arranged with intervals in a sliding direction of the slid member, and inclined to the sliding direction of the slid member, wherein the second housing rotating direction is perpendicular to the sliding direction.

15. An electronic apparatus according to claim 14, wherein each of the ribs have a first part inclined in one direction partly along the sliding direction of the slid member, and a second part inclined oppositely to the one direction.

* * * * *